United States Patent [19]

Iizuka et al.

[11] Patent Number: 4,646,160
[45] Date of Patent: Feb. 24, 1987

[54] FACSIMILE APPARATUS

[75] Inventors: Yoshio Iizuka, Kawasaki; Shigeo Matsunaga, Yokohama; Satoshi Ogawa, Tama, all of Japan

[73] Assignee: Fujitsu Limited, Kawasaki, Japan

[21] Appl. No.: 598,334

[22] PCT Filed: Aug. 30, 1983

[86] PCT No.: PCT/JP83/00281
§ 371 Date: Mar. 14, 1984
§ 102(e) Date: Mar. 14, 1984

[87] PCT Pub. No.: WO84/01074
PCT Pub. Date: Mar. 15, 1984

[30] Foreign Application Priority Data

Aug. 30, 1982 [JP] Japan .................. 57-150380
Aug. 30, 1982 [JP] Japan .................. 57-150381
Aug. 30, 1982 [JP] Japan .................. 57-150382

[51] Int. Cl.[4] ............................................ H04N 1/32
[52] U.S. Cl. ...................................... 358/257; 358/280; 379/100; 379/455
[58] Field of Search ............ 358/256, 257, 280; 179/90 AD, 90 BD

[56] References Cited

U.S. PATENT DOCUMENTS 4,113,992 9/1978 Gorham et al. .................. 358/257

FOREIGN PATENT DOCUMENTS 53-05520 1/1978 Japan .

OTHER PUBLICATIONS

Yasuda Yasuhiko, "Facsimile No Kiso To Oyo" Denshi Tsushin Gakkai (Tokyo), 02/25/80, pp. 201-203.

Primary Examiner—James J. Groody
Assistant Examiner—Edward L. Coles
Attorney, Agent, or Firm—Staas & Halsey

[57] ABSTRACT

A facsimile apparatus for transmitting/receiving image data has a first memory for storing image data of one or more pages, a second memory for storing external apparatus number and time data, and an automatic send control for comparing the time data stored in the second memory with a time signal from a clock, and, upon detecting a coincidence thereof, for supplying the external apparatus number stored in the second memory to a network control to cause an automatic dialing thereof to connect a line with the external apparatus, so that image data is transmitted to or received from the external apparatus. The user of each facsimile apparatus can set or modify polling reception originating terminals, repeating destinations, polling/multi-address calling destinations or the like. The facsimile apparatus is convenient for a user who desires to perform facsimile transmission at a desired time.

22 Claims, 19 Drawing Figures

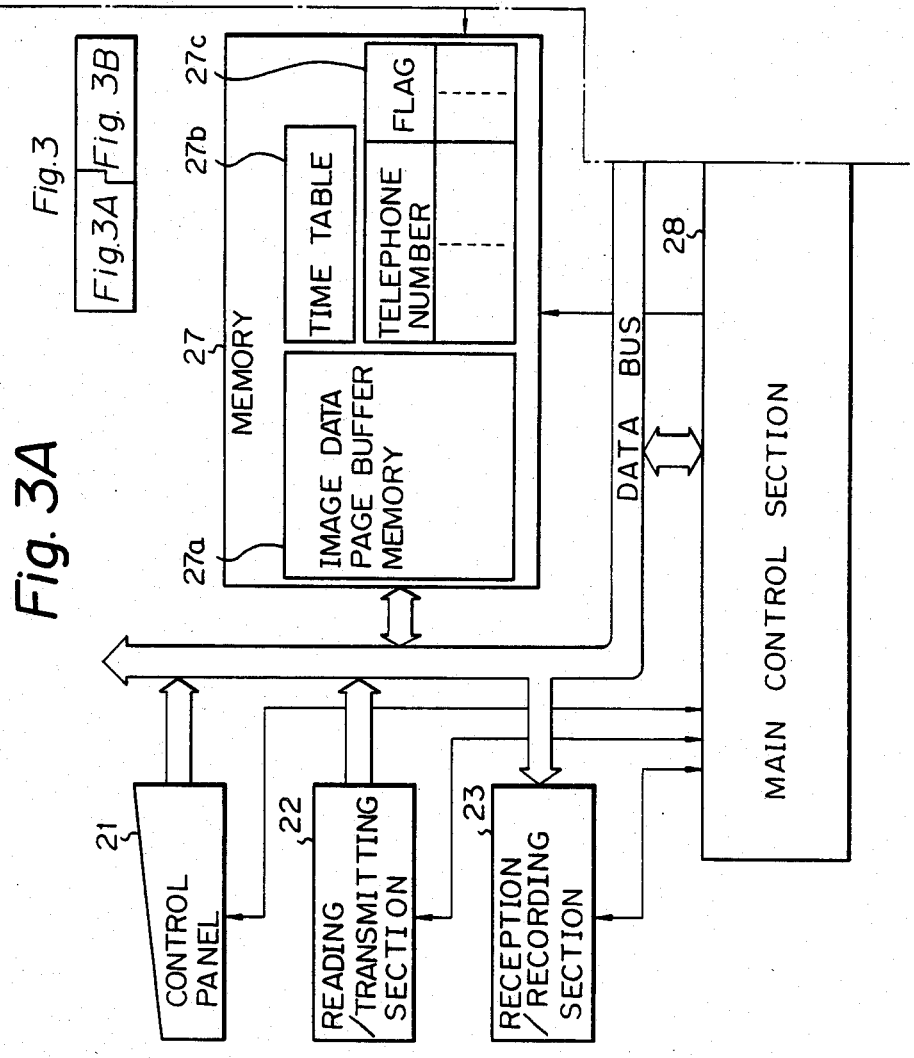

Fig. 7

| | | 27 | | |
|---|---|---|---|---|
| TR00 | | | | |
| 01 | POLLING TIME DATA | POLLING RECEPTION DESTINATION NUMBER | | FLAG |
| 02 | SENDING TIME DATA | REPEATING DESTINATION NUMBER | CALLING DESTINATION NUMBER | FLAG |
| 03 | SENDING TIME DATA | SENDING DESTINATION TELEPHONE NUMBER | | FLAG |
| | TRANSMITTING IMAGE DATA PAGE BUFFER MEMORY | | | |
| | RECEIVING IMAGE DATA PAGE BUFFER MEMORY | | | |

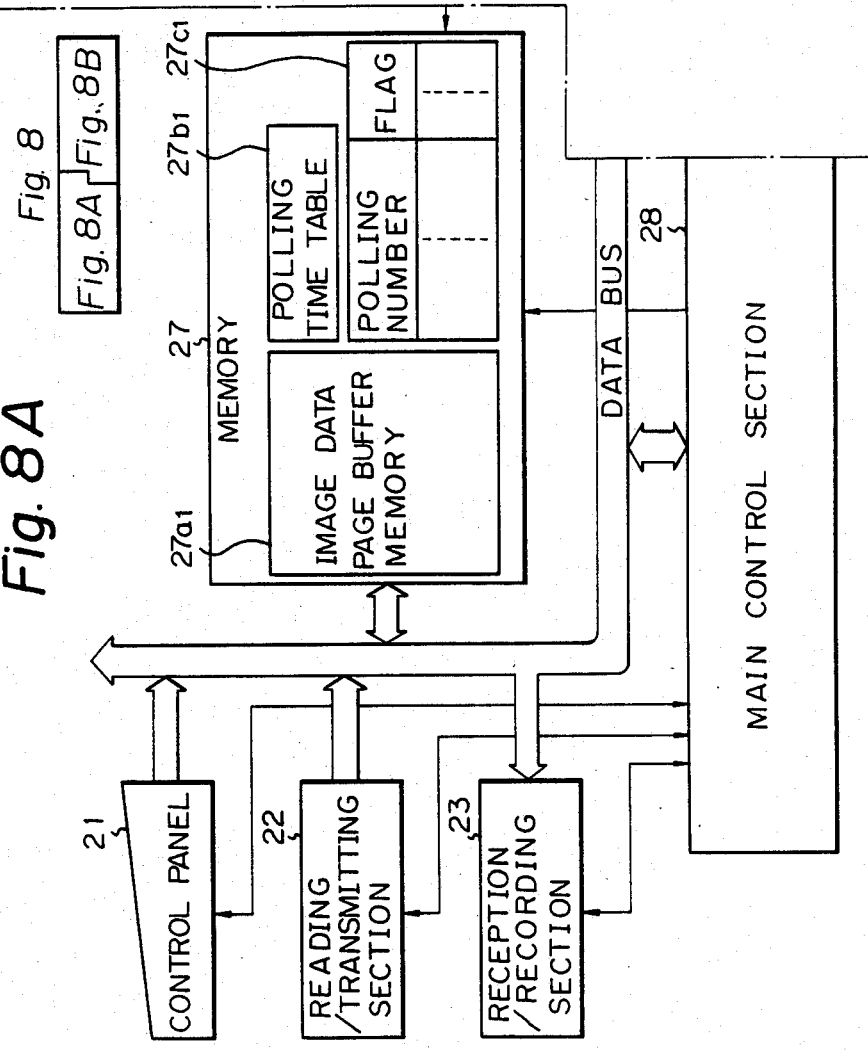

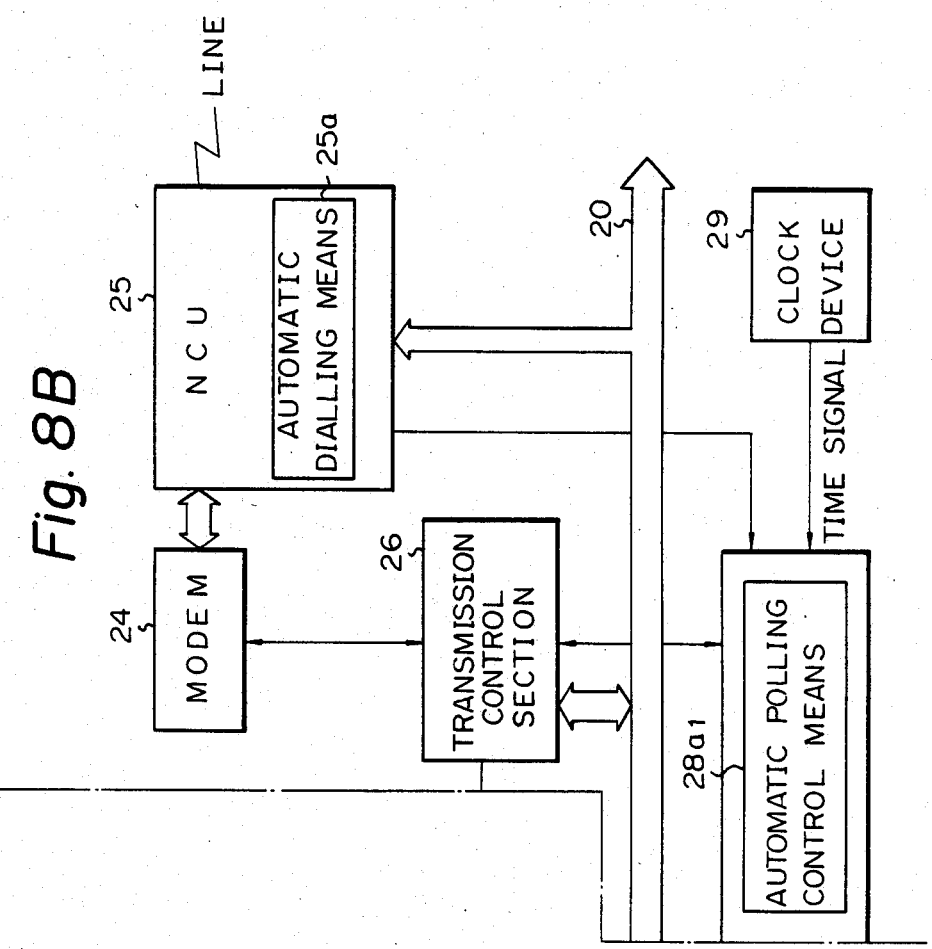

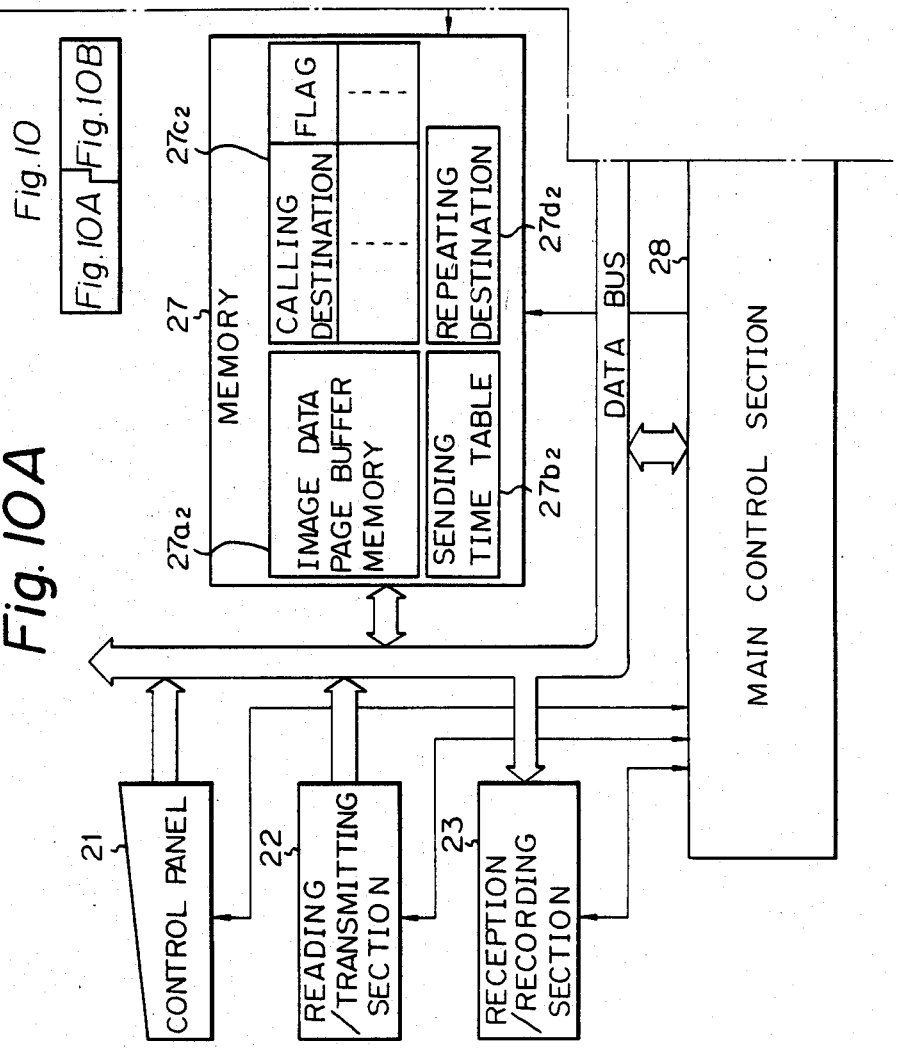

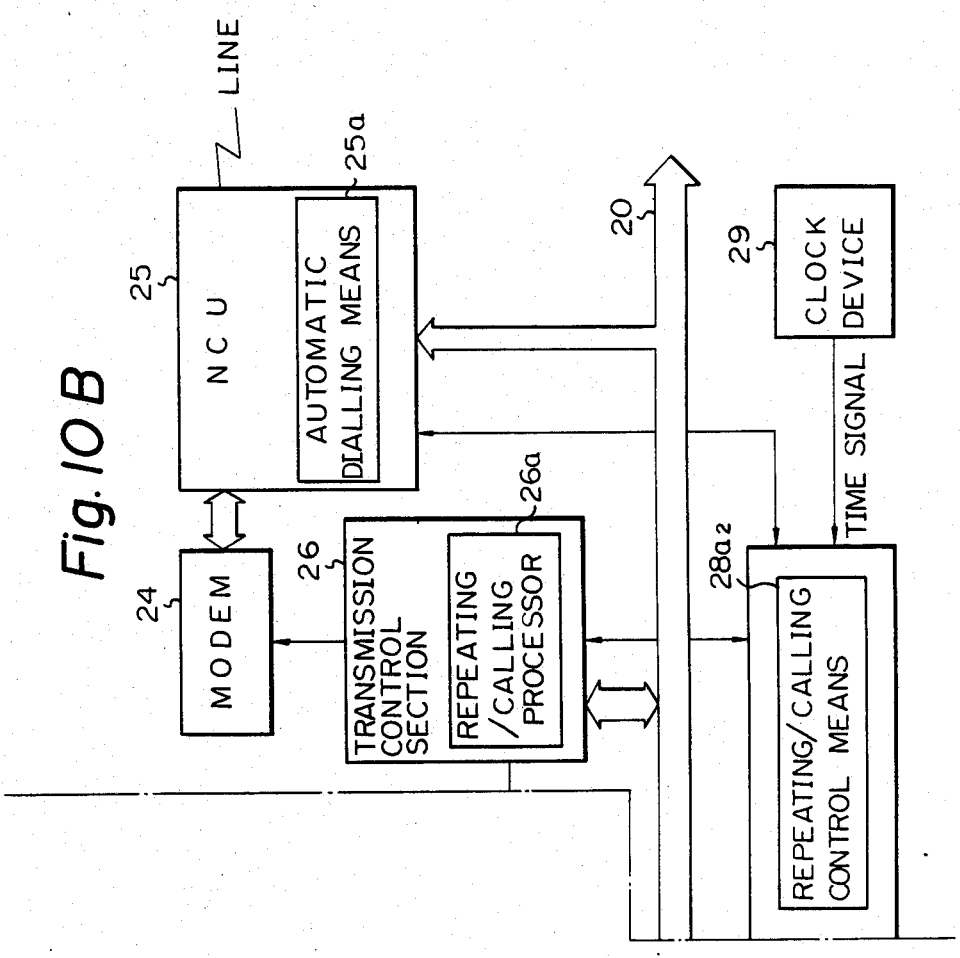

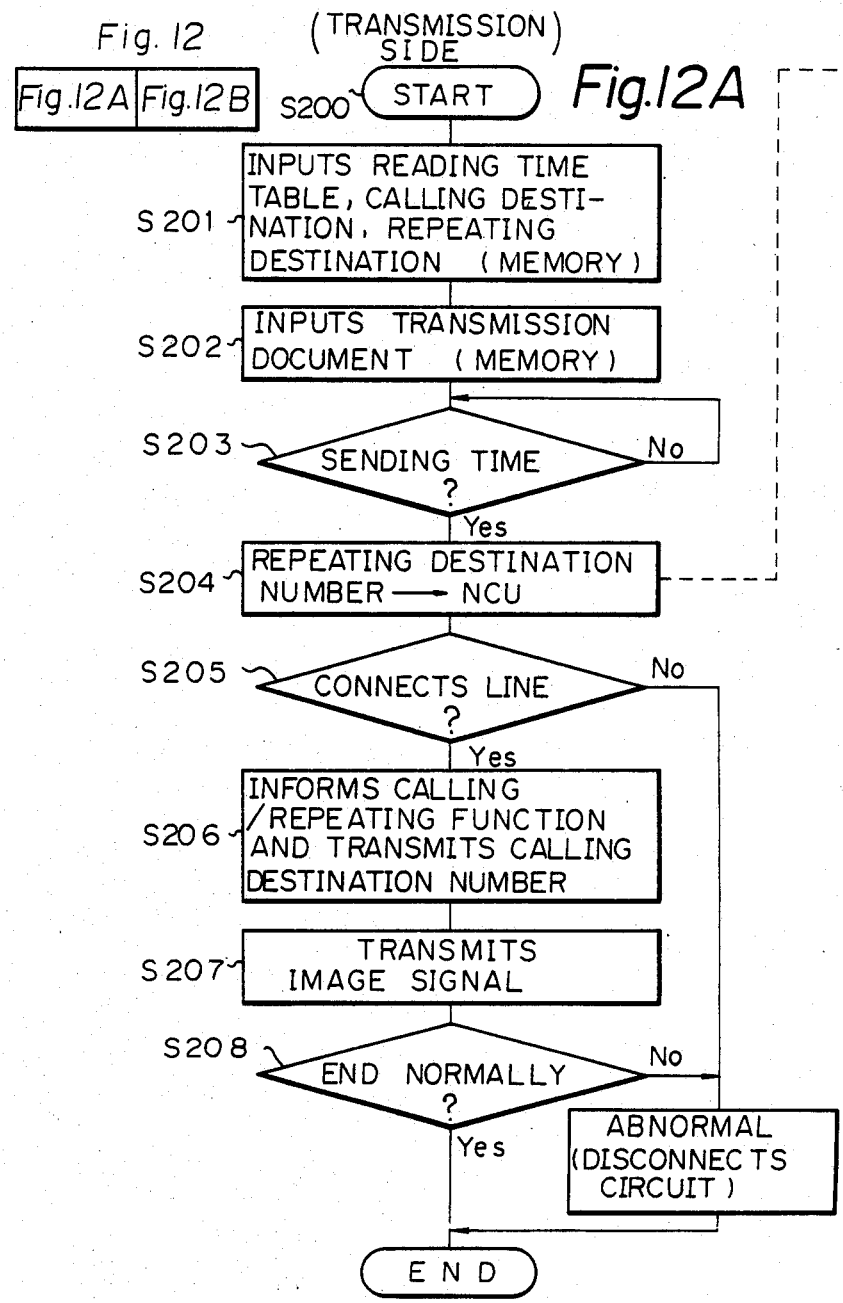

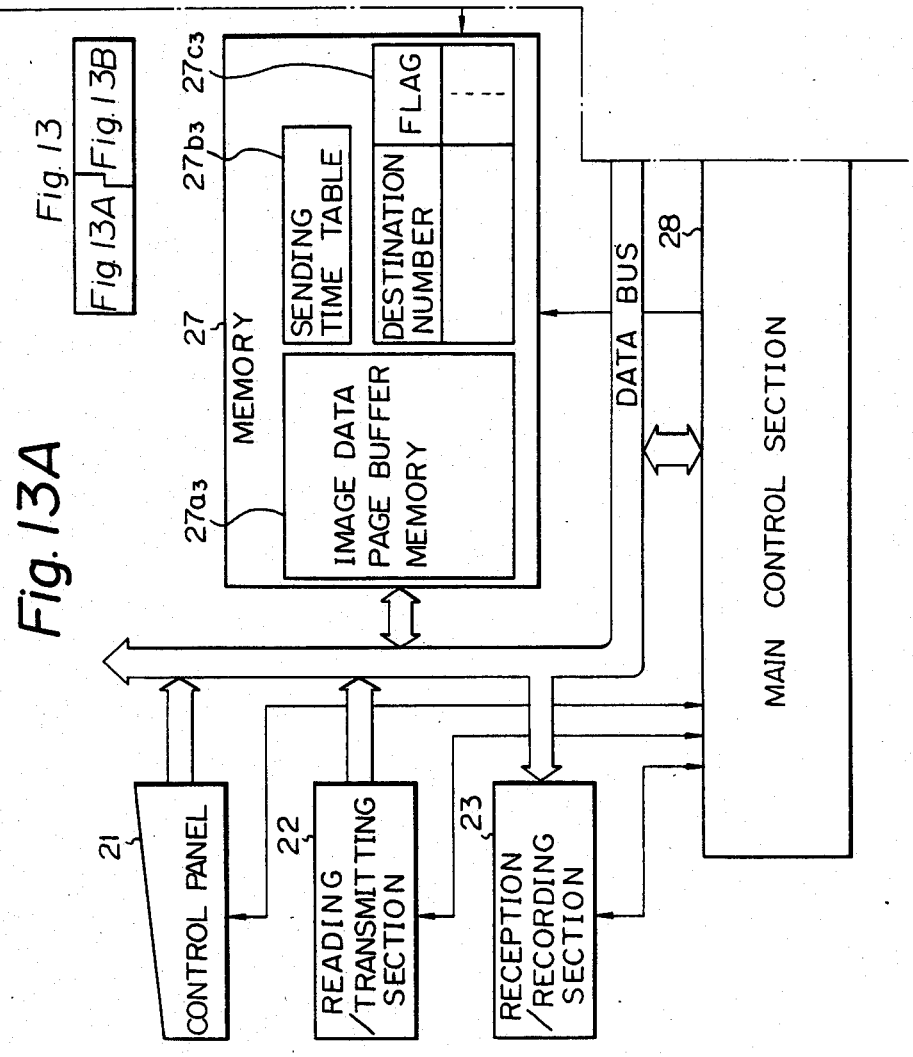

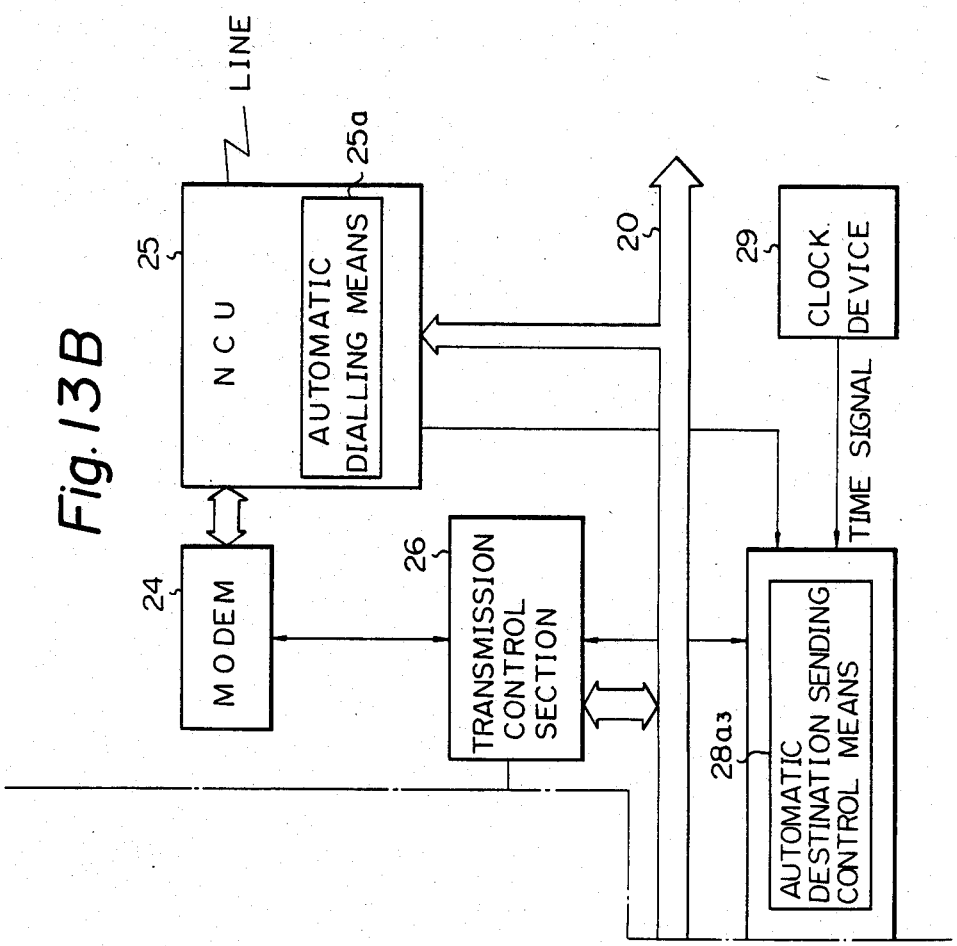

FACSIMILE APPARATUS

BACKGROUND OF THE INVENTION

The present invention relates to a facsimile apparatus. More particularly, the present invention relates to a facsimile apparatus wherein a memory device stores (1) image data in units of pages, (2) an external apparatus number pertaining to a polling reception originating terminal, a multi-address calling destination, a repeating destination terminal, a send destination or the like, and (3) time data for polling reception, transmission or the like, wherein automatic sending control is performed by time designation in accordance with a program, so that limitations imposed on available time of the facsimile apparatus are eliminated and communication cost is reduced.

In a conventional facsimile apparatus, the buffer capacity of the image data corresponds to only a few scanning lines. For this reason, image reading from a document or image recording must be synchronized substantially with transmission of image data on a transmission line. With a conventional facsimile apparatus, a transmission can be performed only when neither of the facsimile apparatuses at the sending and receiving sides is busy, the transmission line connecting them is not busy, and both the sending and receiving parties are ready for such a transmission. This means that the use of a facsimile apparatus by a user is limited to a certain period of time. Regarding operation of a facsimile apparatus, since an operator is required, use of the facsimile apparatus during the nighttime is difficult. When the facsimile apparatus of a receiving side is busy, the user at the sending side must wait until the facsimile apparatus of the receiving side is no longer busy.

In order to solve this problem, a system has been proposed wherein a facsimile apparatus has a memory device having a large capacity, image data is stored in the memory device in units of pages, and transmission of the stored image data is performed between such memory devices of facsimile apparatuses of sending and receiving sides without requiring synchronism with the image reading or recording operation. With this system, the facsimile apparatuses at the sending and receiving sides can be operated independently of each other with respect to time as viewed from the users. However, in order to allow effective functioning of this system, a given destination facsimile apparatus must be automatically polled at a given time and the line must be connected accordingly so as to allow transmission/reception of image data.

In a conventional facsimile transmission system of sequential polling reception type, as shown in FIG. 1, a polling device 8 must be connected through a switching board 7, both of which are separate from and located between the facsimile apparatus terminals 1 and 4 for connecting these terminals. In a conventional repeating-/multi-address calling facsimile system or sequential multi-address calling facsimile system, a multi-address calling device, which is separate from the facsimile apparatus, must be used. For this reason, it is difficult for a user to set or change the polling reception originating terminal, repeating destination, or multi-address calling destination. Since such a system does not have a function for designating polling reception or send times, or a repeating/multi-address calling function, the facsimile transmission cannot be performed at desired times and communication cost is relatively high.

The present invention resolves such problems of the conventional facsimile apparatus as described above.

SUMMARY OF THE INVENTION

It is an object of the present invention to provide a facsimile apparatus wherein: the apparatus has, as a means for allowing polling reception or recording/output of image data stored in a memory device of a polling reception originating terminal at a desired time for a user of a facsimile apparatus on a polling reception side, an automatic polling reception control means utilizing time designation and a page buffer having a capacity of more than one page for inputting and storage of image data at any time without requiring synchronism with a polling reception time and for allowing reception of the image data upon being polled; a user at the sending side feeds a document at a time convenient to that user to store image data in a memory device, and the stored image data is thereafter transmitted to a facsimile apparatus of the receiving side at a desired time directly or through a repeating/multi-address calling device and the users of the respective facsimile apparatuses can easily set or change the polling reception originating terminal, repeating destination, multi-address calling destination or the like, so that facsimile transmission can be performed at a desired time and communication costs are reduced.

This object is achieved by a facsimile apparatus for transmitting/receiving image data of the present invention, which comprises: network control means for controlling a connection with a line; automatic dialling means arranged in said network control means; first memory means for storing image data of one or more pages; input means for inputting time data and transmission/reception destination external apparatus number for the image data; second memory means for storing the external apparatus number and the time data; clock means for generating a time signal; and automatic sending control means for comparing the time data stored in said second memory means with the time signal from said clock means, for supplying the external apparatus number stored in said second memory means to said network control means upon detecting a coincidence of the time data with the time signal, for causing said automatic sending control means to connect a line with the external apparatus, and for performing transmission/reception of the image data with the external apparatus.

According to the present invention, the user of a facsimile apparatus can designate a desired time for a given number of polling reception originating facsimile apparatuses to perform automatic polling reception. The user can also set a desired time and a given number of destinations and repeating destinations so that facsimile transmission can be automatically performed at the desired time independently of the statuses of the line or destination apparatuses. Thus, flexibility of time for using facsimile apparatuses is considerably improved, and communication costs can be reduced.

BRIEF DESCRIPTION OF THE DRAWINGS

FIG. 7 shows a memory configuration of the facsimile apparatus shown in FIGS. 3A and B;

FIGS. 8A and B are block diagram showing the configuration of a facsimile apparatus according to another embodiment of the present invention;

FIGS. 10A and B are block diagrams showing the configuration of a facsimile apparatus according to still another embodiment of the present invention;

FIGS. 13A and B block diagrams showing the configuration of a facsimile apparatus according to still another embodiment of the present invention.

DESCRIPTION OF PREFERRED EMBODIMENTS

Figure 1:
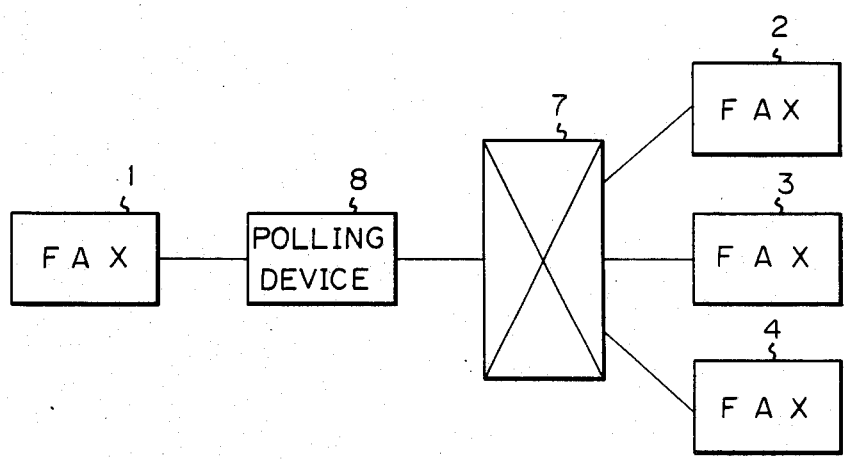
FIG. 1 is a block diagram showing a transmission system using a conventional facsimile apparatus.
Figure 2:
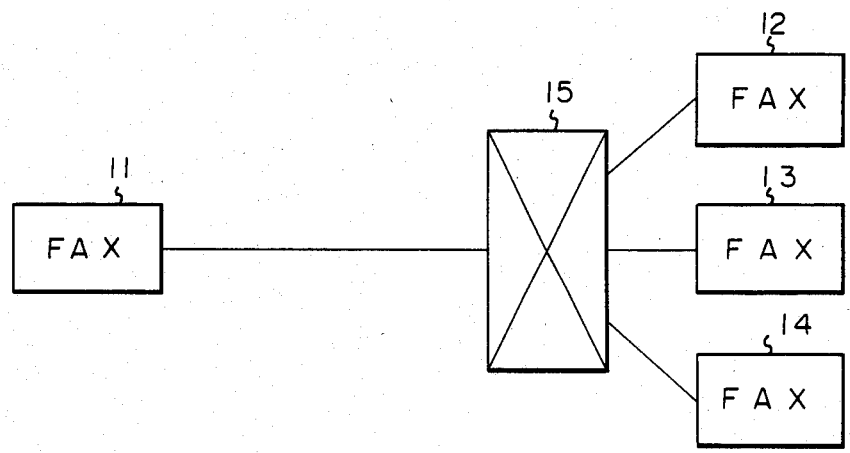
FIG. 2 is a block diagram showing a transmission system in which a facsimile apparatus according to the present invention can be applied.

FIG. 2 shows a transmission system wherein a facsimile apparatus of the invention can be applied. Referring to FIG. 2, polling devices or the like which have been conventionally provided separately of facsimile apparatuses as shown in FIG. 1 are included in facsimile apparatus terminals 11 to 14.

Figure 3B:
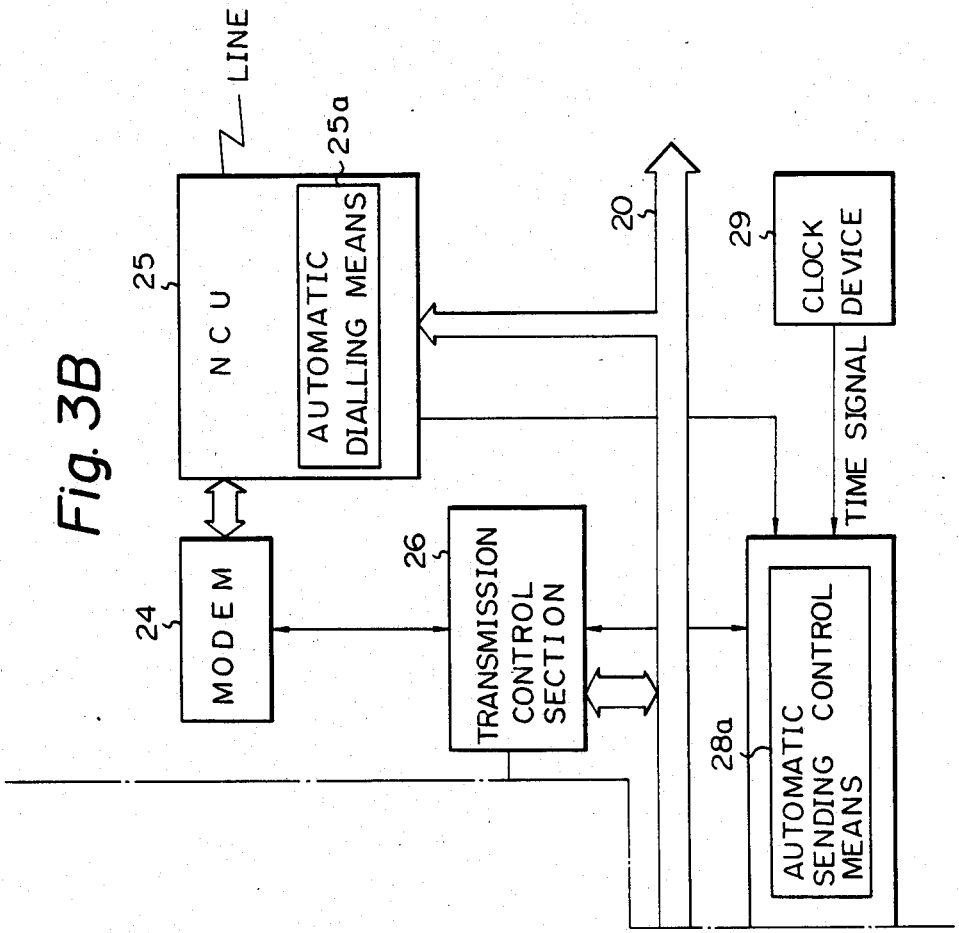
FIGS. 3A and B are block diagrams showing the configuration of a facsimile apparatus according to an embodiment of the present invention.
Figure 4:
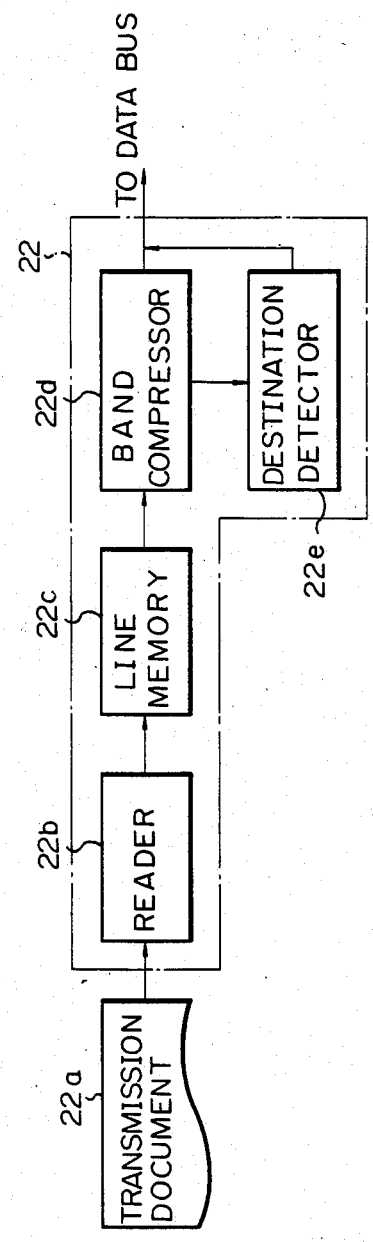
FIG. 4 is a block diagram showing the detailed configuration of a reading/transmitting section of the facsimile apparatus shown in FIGS. 3A and B.
Figure 5:
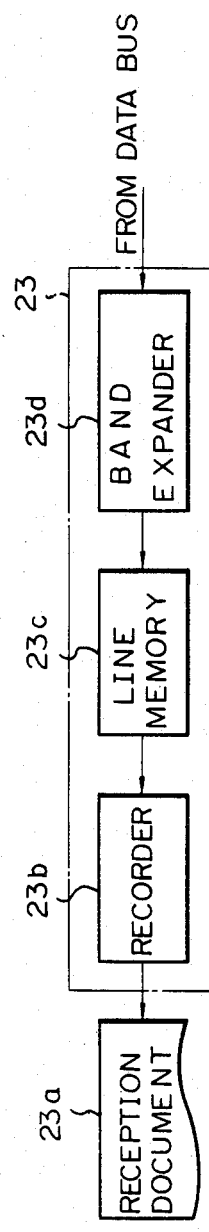
FIG. 5 is a block diagram showing the detailed configuration of a receiving/recording section of the facsimile apparatus shown in FIGS. 3A and B.

FIGS. 3A and B show a facsimile apparatus according to an embodiment of the present invention. The apparatus shown in FIGS. 3A and B has a basic configuration with respect to the embodiments of the present invention.

FIGS. 4 to 7 are block diagrams showing the configuration of the facsimile apparatus shown in FIGS. 3A and B. Referring to all these figures, the facsimile apparatus of the present invention comprises: a control panel 21 including a keyboard and a display; a reading/transmitting section 22 including a mechanism for feeding a transmission document 22a, a reader 22b such as an optical means, a CCD or the like, a line memory 22c, a band compressor 22d adopting the MR (modified READ) scheme, and a destination detector 22e; a reception/recording section 23 including a mechanism for feeding a reception document 23a a recorder 23b, a line memory 23c, and a band expander 23d; a modem 24; a network control means 25 comprising an AA-type NCU capable of automatic sending/receiving; an automatic dialling means 25a arranged in the network control means; a transmission control section 26; a memory 27 including an image data page buffer memory 27a for transmission/reception of image data as shown in detail in FIG. 7, a time table 27b, a telephone number table 27c and the like, the memory 27 comprising a RAM or a floppy disk; a main control section 28 including an automatic sending control means 28a for controlling polling reception, sending and the like and an interface 28b shown in detail in FIG. 6, and a clock device 29.

The basic operation of the apparatus shown in FIGS. 3A and B is based on CCITT Recommendation G3 procedures, wherein transmission or reception of image data is performed through the image data page buffer 27a of the memory 27. The page buffer 27a can store image data of at least one page of the transmission document 22a. For this reason, the reading/transmitting section 22, the reception/recording section 23, and the modem 24 can be selectively coupled to the memory 27 through a data bus 20 by means of the main control section 28 or the transmission control section 26.

As shown in detail in FIG. 7, the time table 27b for desired automatic polling reception, repeating/multi-address sending or automatic destination sending is stored in respective tracks TR00, TR01 . . . of, for example, a floppy disk. The table 27c for the polling reception originating terminal number, the repeating/multi-address calling destination number, and sending destination number is stored together with the corresponding flag bits which are stored in correspondence with the time tables. The time table 27b and the table 27c are stored in predetermined areas of the memory 27 by a keyboard (not shown) on the control panel 21 or by a known optical mark reader OMR method. When the OMR method is adopted, the destination number mark-coded on an input OMR data sheet or the transmission document 22a is read by the reader 22b, band-compressed by the band compressor 22d by the MR scheme through the line memory 22c, and detected by the destination detector 22e.

Figure 6:
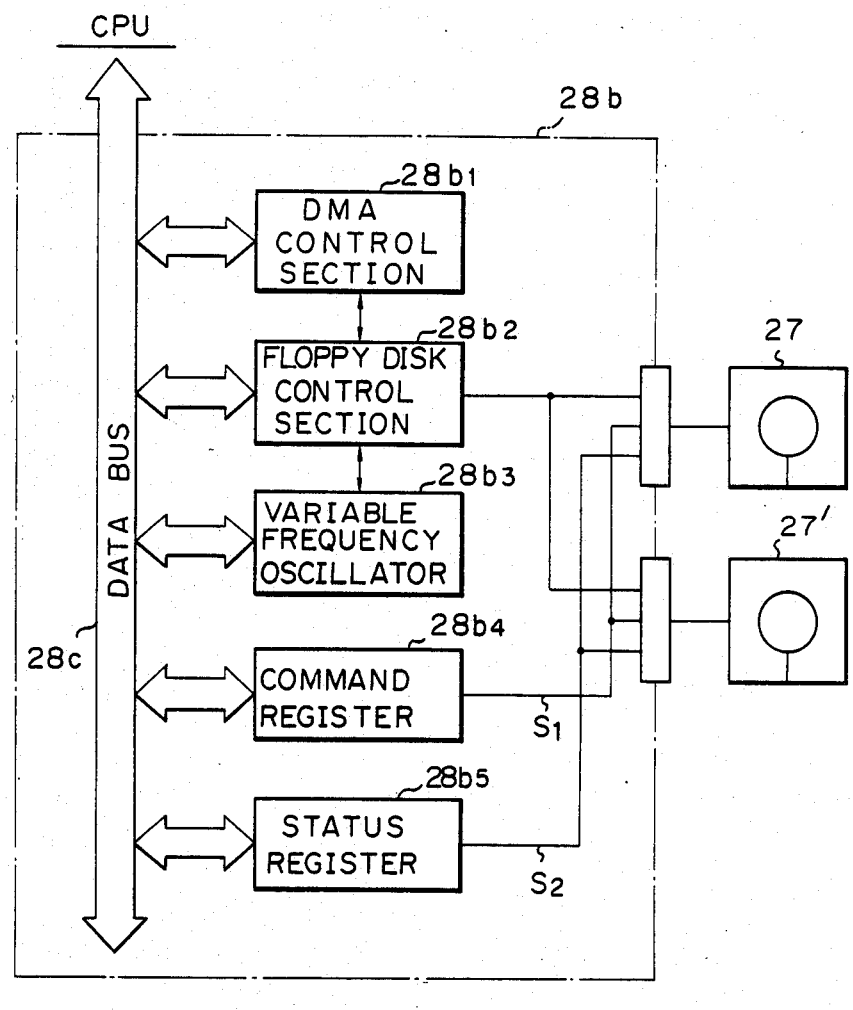
FIG. 6 is a block diagram showing an interface section of a main control section of the facsimile apparatus shown in FIGS. 3A and B.

The interface 28b is arranged in the main control section 28 and comprises a DMA (direct memory access) control 28b1, a floppy disk control 28b2, a variable frequency oscillator (VFO) 28b3, a command register 28b4, and a status register 28b5, as shown in detail in FIG. 6. The interface 28b controls read/write operation of floppy disks 27 and 27' as the memory through a data bus 28c in accordance with control commands from a first CPU (not shown) also included in the main control section. The main control section also includes another CPU (not shown) which reads out image data transferred from the reading/transmitting section 22, temporarily stores it in a RAM (not shown) and band-compresses it, and then stores the band-compressed image data in the RAM again The image data stored in the RAM is DMA-transferred through the data bus 28c by the DMA control 28b1 under the control of the first CPU described above, and the start address, the end address, the transfer byte number and the like are transferred to control the floppy disk 27. The floppy disk control 28b2 controls the data to be read into the floppy disk 27 and the like. The command register 28b4 supplies a select signal S1 for selection of a floppy disk among a plurality of floppy disks 27 and 27' and the like. The status register 28b5 supplies a command to the first CPU above in accordance with a ready signal S2 supplied from the floppy disk 27 when the operation of the floppy disk 27 is stabilized.

The automatic sending control means 28a compares the time table 27d as the second memory means and a time signal from the clock device 29 as the clock means. When a coincidence is established, the automatic sending control means 28a supplies to the network control means 25 the external apparatus number such as the polling reception originating terminal, the repeating-/multi-address calling destination, sending destination and the like which are stored in the telephone number table 27c. The automatic sending control means 28a also causes the automatic dialling means 25a to perform line connection with the corresponding external apparatus so as to perform transmission/reception of image data therewith.

FIGS. 8A and B are block diagrams showing the configuration of a facsimile apparatus according to another embodiment of the present invention. The apparatus shown in FIGS. 8A and B has an automatic polling reception function. In this case, a memory 27 stores for automatic polling reception a polling reception time data 27b1 as a time table and a polling reception originating terminal number table 27c1 a telephone number table. A main control section 28 has an automatic polling reception control means 28a1 as an automatic sending control means.

The automatic polling reception control means 28a1 compares the polling reception time data 27b1 and the time signal from the clock device 29 and initiates the automatic polling reception operation upon detecting a coincidence between the two data. One number is first read out from the polling reception originating terminal number table 27c1 and is supplied to the automatic dialling means 25a of the NCU 25 so as to perform automatic destination sending, i.e., line connection by automatic calling.

The table 27c1 includes normal end flags which correspond to the respective polling reception originating terminal numbers and which indicate the polling reception statuses thereof. Each normal end flag is turned off upon initialization of the system and a normal end flag of a specific polling reception originating terminal number is turned on when image data polling reception is normally performed from a facsimile apparatus corresponding to the specific number included in the table during sequential polling reception processing. In this manner, end and not-end numbers can be discriminated by means of flag display during polling reception processing, so that the process and result of polling reception processing can be controlled. If an apparatus of a specific number is busy or the like and a corresponding flag is OFF, this apparatus is called again after a predetermined period of time.

The transmission control section 26 performs page number control so as to allow transmission of image data corresponding to a plurality of pages by a single transmission.

A telephone number or an abbreviated dialling number can be set as a polling reception originating terminal number, or a given number of numbers can be grouped and set. In the case of an abbreviated dialling number, the number is converted into a telephone number by the automatic polling reception control means 28a1 and the converted number is supplied to the NCU 25. When a group of numbers are designated, all the numbers included in the group are converted.

Figure 9:
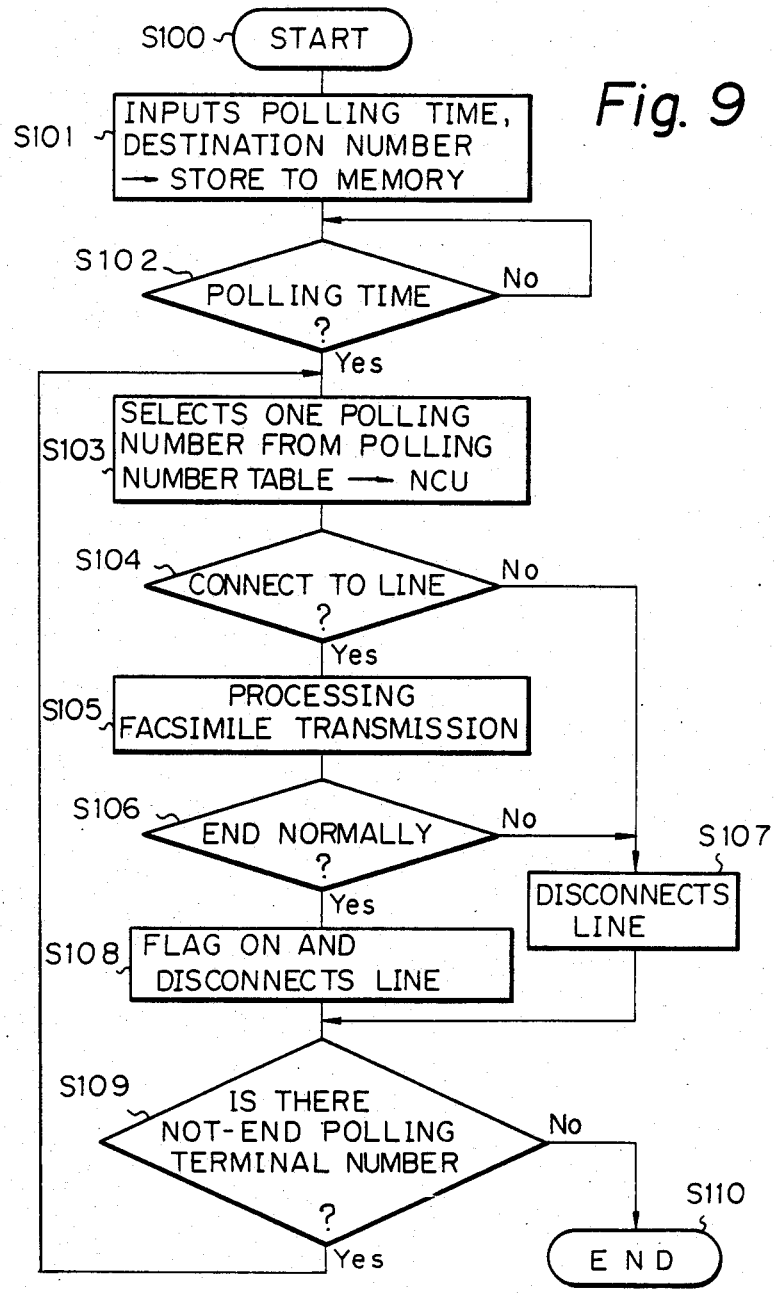
FIG. 9 is a flow chart for explaining the operation of the facsimile apparatus shown in FIG. 8A and B.

FIG. 9 is a schematic flow chart of the facsimile apparatus shown in FIGS. 8A and B. A description will now be made with reference to FIG. 9.

In step S101, the user who desires to perform automatic polling reception or automatic sequential polling reception processing inputs into the facsimile apparatus necessary data such a polling reception time or polling reception originating terminal numbers by means of the keyboard or the OMR means of the control panel 21.

The input information is stored in the predetermined areas of the memory 27.

In step S102, the automatic polling reception control means 28a1 constantly compares in a loop the polling reception time data 27b1 and the time signal from the clock device 29. When a coincidence is detected, the automatic polling reception processing is started.

In step S103, the automatic polling reception control means 28a1 selects one polling reception originating terminal number from the polling reception originating terminal number table 27c1, converts it into a telephone number as needed, and supplies the number digits to the automatic dialling means 25a of the NCU 25 one by one. The automatic dialling means 25a then performs a call operation in accordance with the received telephone number and causes the NCU of the polling reception originating facsimile apparatus to perform a line connection.

When it is determined in step S104 that the originating facsimile apparatus is connected to the line, the connection between the automatic dialling means 25a and the line is switched to that between the modem 24 and the line, and an end of connection operations is signalled to the automatic polling reception control means 28a1.

In step S105, the operation of the main control section 28 is terminated, and the transmission control section 26 starts operating. In accordance with the facsimile transmission G3 procedures, the transmission control section 26 performs preparatory procedures for requesting to send image data to the polling reception originating facsimile apparatus. In each of the facsimile apparatuses of both the sending and receiving sides, the transmission control section 26 couples, simultaneously with execution of the preparatory procedures, the signal line of the modem 24 to the image data page buffer 27a of the memory 27 through the data bus 20. Image data read out from the page buffer 27a or image data converted from the document 22a at the polling reception originating facsimile apparatus is transmitted through the corresponding modem 24, the NCU 25 and the line, and is received by the NCU 25 and the modem 24 of the receiving facsimile apparatus. The received image data is stored in the page buffer 27a.

When it is determined in step S106 that transmission has ended normally, the transmission control section 26 signals an end of transmission to the automatic polling reception control means 28a1.

In step S108, the automatic polling reception control means 28a1 commands a line disconnection to the NCU 25 and turns on the flag of the corresponding number of the polling reception originating terminal number table 27c1. The NCU 25 disconnects the line.

If it is determined in step S109 that there is a not-end polling reception originating terminal number in the polling reception originating terminal number table 27c1 which has the corresponding flags which are ON, the sending operation for a facsimile apparatus of the corresponding number is resumed. When there is no more not-end polling reception originating terminal number in the table, processing is ended.

When it is determined in step S104 that a line is busy and a necessary connection cannot be performed, polling reception for other not-end polling reception originating terminal numbers is started. Alternatively, the originating terminal connected to the busy line is called again after a predetermined period of time. For an originating terminal for which polling reception was not completed within a prescribed period of time, an abnormal end is determined. The control panel 21 or the reception/recording section 23 can display the transmission processing result.

In the facsimile processing operation in step S105, when transmission image data corresponds to a plurality of pages, image data of all the pages is sequentially transmitted and the flow goes to step S106 after completion of transmission of image data of all the pages. In this case, the transmission control section 26 must have a page transmission control function; it compares the preset page number with the page number of currently transmitted image data and repeats the transmission control until a coincidence between the two numbers is detected.

It is also possible to set different polling reception times for the respective polling reception originating terminals. The image signals received by polling reception can be recorded or output immediately or at a desired time by using a password (cipher) or the like.

FIGS. 10A and B are block diagrams showing the configuration of a fascimile apparatus according to still another embodiment of the present invention. The apparatus shown in FIGS. 10A and B has a repeating-/multi-address calling function. In this case, a memory 27 stores a sending time table $27b2$ for desired repeating/multi-address calling as a time table, a multi-address calling destination table $27c2$ as a telephone number table, and repeating destination number data $27d2$. However, if direct, sequential multi-address calling communication is to be performed without repeating, the repeating destination number data $27d2$ can be omitted, and the multi-address calling number table $27c2$ need only be stored. A main control section 28 has a repeating/multi-address calling control means $28a2$ as an automatic sending control means.

The repeat/multi-address calling control means $28a2$ compares the sending time data $27b2$ with a time signal from a clock device 29 and initializes a repeating/multi-address calling operation upon detecting a coincidence. First, a repeating destination number is read out and supplied to an automatic dialling means $25a$ of an NCU 25 so as to perform a line connection by automatic destination sending, i.e., line connection by automatic calling.

In a facsimile apparatus which has been requested to perform a repeating/multi-address calling, the contents of the multi-address calling destination number table $27c2$ are those which are transferred from an apparatus which has requested a repeating/multi-address calling. This transfer operation is performed in the following manner.

When the NCU 25 at the sending side completes a line connection with the facsimile apparatuses which have been requested in the repeating/address calling, the transmission control section 26 starts facsimile transmission procedures. At this time, using a command NSS of preparatory procedures, the repeating/multi-address calling control means $28a2$ at the sending side causes its transmission control section 26 to send the repeating-/multi-address calling function indication and the multi-address calling destination number table $27c2$ to the repeating/multi-address calling facsimile apparatus. When a repeating/multi-address calling processor $26a$ in the facsimile apparatus which has been requested to perform a repeating/multi-address calling detects a repeating/multi-address calling function indication in the received signals, it signals this to its own repeating-/multi-address calling control means $28a2$ and stores in its memory 27 the repeating/multi-address calling destination number table $c2$ following the repeating/multi-address calling function indication.

Figure 11:
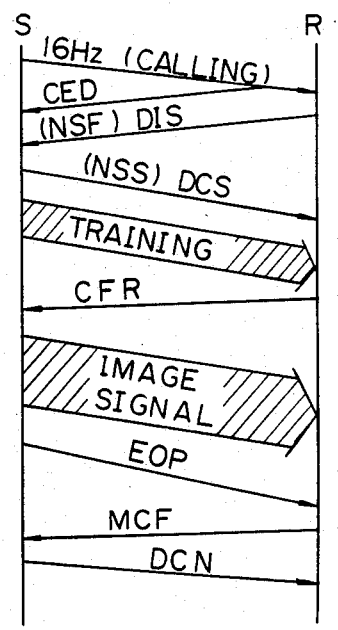
FIG. 11 is a diagram showing the transmission procedures of the facsimile apparatus shown in FIGS. 10A and B.

FIG. 11 is a diagram showing the G3 procedures as transmission procedures in the apparatus shown in FIGS. 10A and B. In accordance with a command NSS indicating a non-standard system, the repeating/multi-address calling function indication and multi-address calling destination number table are transmitted to a facsimile apparatus which has been requested to perform a repeating/multi-address calling.

When image data corresponding to a plurality of pages is to be transmitted simultaneously to a single destination, a plurality of page buffer areas (not shown) are used and the number of pages is set.

The destination number of repeating/multi-address calling can be set by a telephone number or an abbreviated dialling number. Such numbers can also be set in a group. When an abbreviated dialling number is used, it is first converted into a telephone number by the repeating/multi-address calling control means $28a2$ and the obtained telephone number is supplied to the NCU 25. When a group of numbers are set, the numbers of the same group are all converted into corresponding telephone numbers.

Figure 12B:
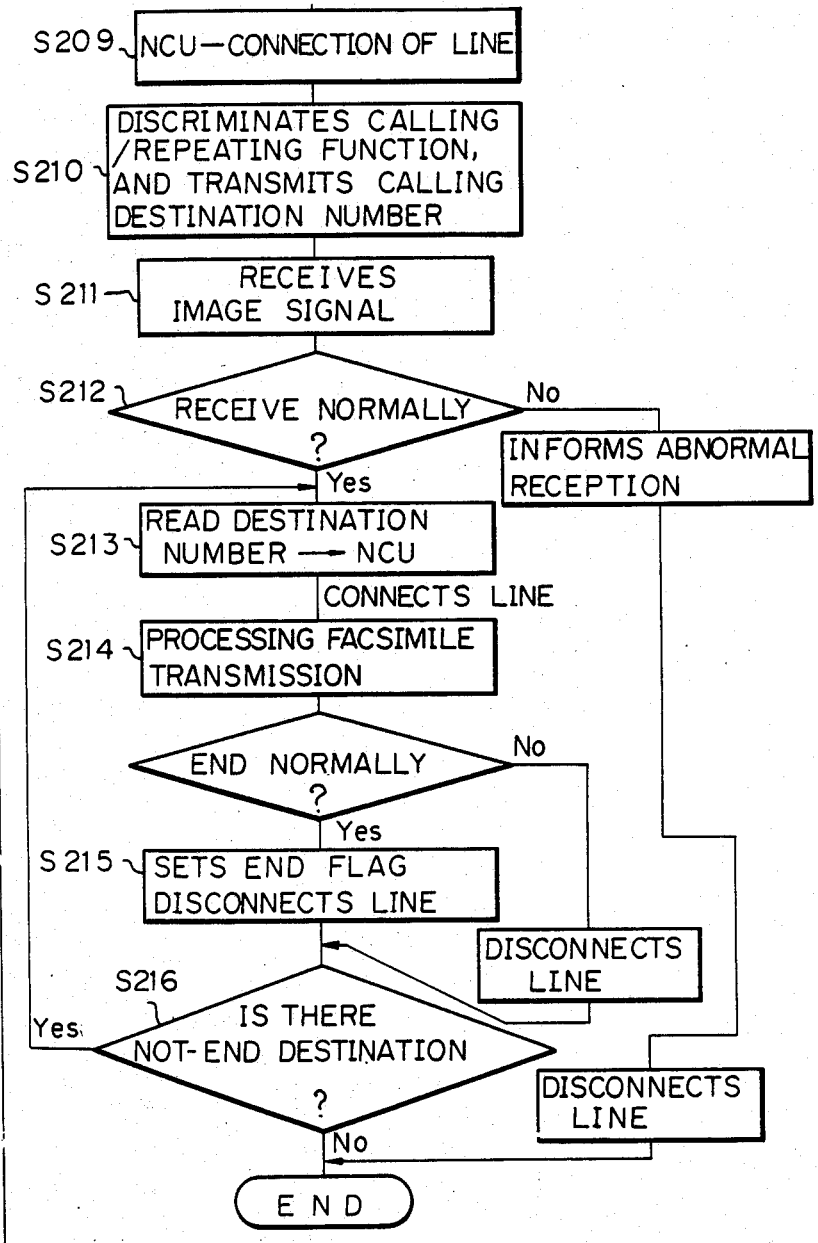
FIGS. 12A and B are flow chart for explaining the operation of the facsimile apparatus shown in FIGS. 10A and B.

FIGS. 12A and B schematic flow charts of the operation of the facsimile apparatus shown in FIGS. 10A and B. A description will be made with reference to FIGS. 12A and B.

(Sending side)

In step S201, the user inputs the send time, the multi-address calling destination number, repeating terminal number, the number of copies of a document at the multi-address calling destination and so on by means of the control panel 21 or the OMR means. The input data is stored at predetermined data areas of the memory 27. As has been mentioned earlier, all the numbers of the multi-address calling destinations are input in the case of multi-address calling.

In step S202, the transmission document $22a$ is input from the reading/transmitting section 22. The image on the document $22a$ is converted into binary electrical signals by the reading/transmitting section 22. The signals are supplied to the band compressor $22d$ through the line memory $22c$ to be data compressed by the MH coding scheme or the MR coding scheme. The compressed data is stored in an image page buffer $27a2$ in units of pages.

In step S203, the repeating/multi-address calling control means $28a2$ constantly compares in a loop the sending time data $27b2$ and a time signal from the clock device 29. When a coincidence is detected, the repeating/multi-address calling control means $28a2$ starts the repeating/multi-address calling operation.

In step S204, the automatic dialling means $25a$ of the NCU 25 calls a terminal. The dialling number is supplied in units of digits to the automatic dialling means $25a$ from the repeating destination number data $27d2$ of the memory 27.

When it is determined in step S205 that the facsimile apparatus terminal which has been requested to perform a repeating is connected to the line, the connection between the automatic dialling means $25a2$ and the line is switched to that between the modem 24 and the line. An end of connection operations is then signalled to the repeating/multi-address calling control means $28a2$.

In step S206, the control operation of the main control section 28 is terminated, and the transmission control section 26 starts operating. In the preparatory procedures of facsimile transmission G3 procedures, the transmission control section 26 generates a command NSS, and the repeating/multi-address calling function indication and the multi-address calling destination number table 27c2 are transferred.

In step S207, following the preparatory procedures, image data is read out from the page buffer 27a2, and the readout image data is transmitted to the receiving facsimile apparatus through the modem 24, the NCU 25 and the line.

When it is determined in step S208 that transmission has been abnormal, retransmission or the like is performed. On the other hand, if it is determined in step S208 that transmission has been performed normally, it is signalled to the main control section 28. Then, the main control section 28 commands the NCU 25 to disconnect the line, and the NCU 25 disconnects the line accordingly.

(Receiving side)

In step S209, the NCU 25 of the receiving side facsimile apparatus which has been requested to perform a repeating/multi-address calling detects a call and connects the line if it is not busy.

In step S210, the NCU 25 initializes the transmission control section 26 to start the preparatory procedures for facsimile transmission. The repeating/multi-address calling processor 26a discriminates the repeating/multi-address calling function indication from the received non-standard command NSS and also receives the multi-address calling destination table 27c2. The repeating-/multi-address calling processor 26a and the repeating-/multi-address calling control means 28a2 are initialized, and the multi-address calling destination table 27c2 is stored in the memory 27.

In step S211, following the preparatory procedures, the main control section 26 connects the modem 24 to the data bus 20 and stores the received image data in the page buffer 27a2.

When the main control section 28 detects in step S212 that the reception of image data to be subjected to repeating/multi-address calling has been received normally, it starts the repeating/multi-address calling processing.

In step S213, the repeating/multi-address calling control means 28a2 selects one destination number from the multi-address calling destination table 27c2 and supplies it to the automatic dialling means 25a of the NCU 25, and establishes a connection between the line and the selected destination.

When the destination facsimile apparatus is connected to the line, the connection between the automatic dialling means 25a and the line is switched to that between the modem 24 and the line. An end of connection operation is signalled to the repeating/multi-address calling control means 28a2.

In step S214, the control operation of the main control section 28 is terminated, and the transmission control section 26 starts operating. In accordance with the facsimile transmission G3 procedures, the transmission control section 26, following the preparatory procedures, reads out the image data from the page buffer 27a2, and transmits it to the multi-address calling destination facsimile apparatus through the modem 24, the NCU 25, and the line.

When it is determined that transmission has been performed abnormally, the transmission control section 26 performs retransmission or the like. On the other hand, if it is determined that transmission has been performed normally, the transmission control section 26 signals this to the modem 24 and the repeating/multi-address calling control means 28a2.

In step S215, the repeating/multi-address calling control means 28a2 sets ON the normal end flag of the corresponding number in the multi-address calling destination number in the multi-address calling destination number table 27c2 and simultaneously commands the NCU 25 to disconnect the line. The NCU 25 disconnects the line accordingly.

If it is determined in step S216 that there is another not-end destination number having the corresponding flag OFF in the destination number table 27c2, the repeating/multi-address calling control means 28a2 resumes the sending operation. When there is no more not-end destination number, the repeating/multi-address calling control means 28a2 stops processing.

When a connection cannot be performed in step S213 due to the busy state of the line or the like, the sending operation for another not-end destination number is started. Alternatively, the same number is called again after a predetermined period of time. When transmission is not completed within a predetermined period of time upon monitoring the time, an abnormal transmission is detected. This is signalled to the facsimile apparatus which has requested the processing so that the processing result is displayed at the control panel 21 or the receiving/recording section 23.

When image data to be transmitted corresponds to a plurality of pages in the facsimile transmission processing of step S214, image data of all required pages is transmitted and thereafter the flow goes to step S215. In this case, the transmission control section 26 must have the page transmission control function such that transmission control is repeated until the preset page number coincides which the page number of the image data which is being transmitted. A plurality of combinations of the send times, the repeating destinations, and image data may be adopted.

FIGS. 13A and B block diagrams showing the configuration of a facsimile apparatus according to still another embodiment of the present invention. The apparatus shown in FIGS. 13A and B has the automatic destination sending function. In this case, a memory 27 stores send time data 27b3 for automatic destination send and a destination number table 27c3 as a telephone number table. A main control section 28 has an automatic destination sending control means 28a3 as an automatic sending control means.

The automatic destination sending control means 28a3 compares the send time data 27b3 with a time signal from a clock device 29. When they coincide, the automatic destination sending control means 28a3 starts automatic destination send. First, one destination number is read out from the destination number table 27c3 and is supplied to an automatic dialling means 25a of an NCU 25. The automatic dialling means 25a performs an automatic destination send, that is, a line connection by automatic calling so that a transmission of image data is performed.

When sequential multi-address calling communication is to be performed, a plurality of destination numbers are set in the destination number table 27c3. Flags for indicating normal transmission are also included in correspondence with the respective numbers stored in the table 27c3 and are set ON every time the multi-address calling of the corresponding destination apparatuses have been normally completed. When a flag is OFF due to the busy status of the line or the like, a plurality of page buffer areas (not shown) are used and the number of such pages is set.

A telephone number or an abbreviated dialling number can be set as a destination number. A group of numbers can also be set. When an abbreviated dialling number is used or a group of numbers are set, it or they are converted into the corresponding telephone numbers by the automatic destination sending control means 28a3. When such a group of numbers are set, all the numbers in the group are converted.

Figure 14:
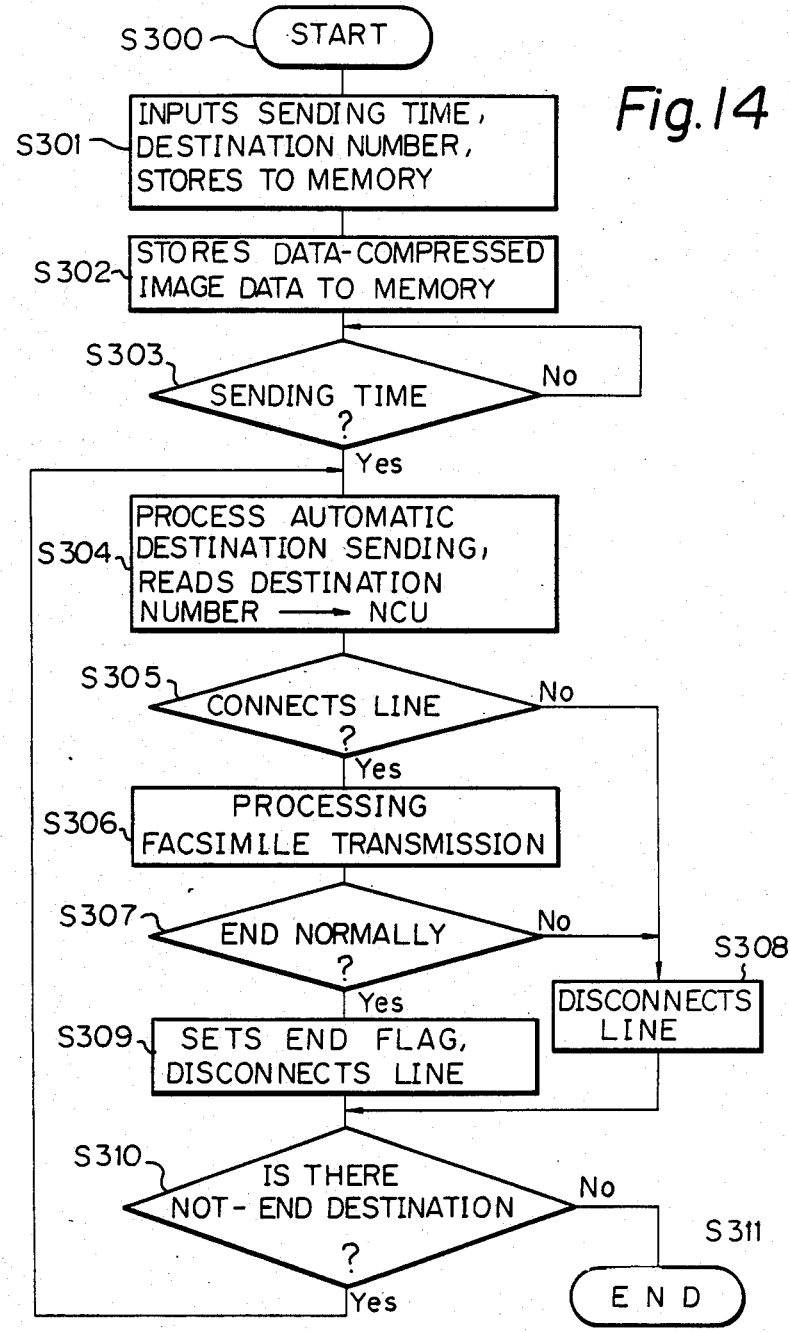
FIG. 14 is a flow chart showing the operation of the facsimile apparatus shown in FIGS. 13A and B.

FIG. 14 is a schematic flow chart for explaining the mode of operation of the facsimile apparatus shown in FIG. 13. A description will now be made with reference to FIG. 14.

In step S301, the user inputs the send time, the destination number, and the number of copies of a single document to be produced at the receiving side and these input data are stored at data areas 27b3, 27c3 and so on of the memory 27. As has been described earlier, in the case of multi-address calling communication, all the numbers for multi-address calling destinations are input.

In step S302, a transmission document 22a is input by a reading/transmitting section 22. An image on the document 22a is converted into binary electrical signals by the reading/transmitting section 22. The electrical signals are supplied to a band compressor 22d through a line memory 22c to be data-compressed by the MH coding scheme or the MR coding scheme. The signals are stored in an image data page buffer 27a3 in units of pages.

In step S303, the automatic destination sending control means 28a3 constantly compares in a loop the send time data 27b3 with a time signal from a clock device 29. When they coincide, the automatic destination sending control means 28a3 starts the automatic destination send operation.

In step S304, an automatic dialling means 25a of an NCU 25 calls a destination. One dial number is selected from a destination number table 27c3 of a memory 27 by the automatic destination sending control means 28a3 and is supplied to the automatic dialling means 25a in units of digits.

When it is determined in step S305 that the destination facsimile apparatus is connected to the line, the connection between the automatic dialling means 25a and the line is switched to that between a modem 24 and the line. An end of line connection is signalled to the automatic destination sending control means 28a3.

In step S306, a main control section 28 stops the control operation, and a transmission control section 26 starts operating. In accordance with the facsimile transmission G3 procedures, following the preparatory procedures, the transmission control section 26 reads out the image data from the page buffer 27a3 and transmits it to the destination facsimile apparatus through the modem 24, the NCU 25 and the line.

When it is determined in step S307 that the transmission has been abnormal, the transmission control section 26 performs retransmission or the like. On the other hand, if it is determined in step S307 that the transmission has been completed normally, the transmission control section 26 signals this to the main control section 28.

In step S308, the main control section 28 sets the normal end flag of the corresponding number in the destination number table 27c3 and commands the NCU 25 to disconnect the line. The NCU 25 disconnects the line accordingly.

When it is determined in step S309 that there is another not-end destination number having the corresponding flag OFF in the destination number table 27c3, the send operation for this number is started again. When there is no more such not-end destination number, the processing flow is ended.

When it is determined in step S305 that the line cannot be connected due to the busy status or the like, the processing for another not-end destination number is started or recalling for this number is performed again after a predetermined period of time. When it is determined that a transmission is not terminated within a predetermined period of time by monitoring the time, an abnormal transmission is detected. In this case, the transmission result is displayed at a control panel 21 or at a receiving/recording section 23.

When image data to be transmitted corresponds to a plurality of pages in the facsimile transmission processing in step S306, the image data of all the pages is transmitted and thereafter the flow goes to step S307. In this case, the transmission control section 26 must have the page transmission control function; it compares the set page number and the page number of the image data which is being transmitted and repeats the transmission control until they coincide. A plurality of combinations of the send times, destination numbers and the image data may be adopted.

We claim:

1. A facsimile apparatus for communication image data with at least one external apparatus, comprising
    network control means for controlling connection with a line to said at least one external apparatus,
    automatic dialing means arranged in said network control means,
    first memory means for storing said image data in correspondence to the pages thereof,
    means for inputting external apparatus number data for identifying each said external apparatus for said communicating and time data specifying the time of said communicating of the respective image data,
    second membry means for storing said external apparatus number data and the time data,
    clock means for generating a time signal, and
    automatic sending control means for comparing the time data stored in said second memory means with each said time signal from said clock means, and, upon detecting each coincidence therebetween, for supplying the respective external apparatus number data stored in said second memory means to said network control means to cause said automatic dialing means thereof to connect the line with the respective external apparatus corresponding to said external apparatus number data, and to cause the respective image data to be communicated with the respective external apparatus.

2. A facsimile apparatus according to claim 1, comprising
    transmission control means connected to said automatic sending control means,
    wherein said external apparatus number data stored in said second memory means includes polling reception originating terminal external apparatus number data corresponding to said at least one external apparatus being a polling reception originating external apparatus, and respective polling reception time data as said time data, and wherein said automatic sending control means compares the polling reception time data stored in said second memory means with the time signal from said clock means, and, upon detecting coincidence therebetween, supplies the polling reception originating terminal external apparatus number data stored in said second memory means to said network control means to cause said automatic dialling means thereof to connect the line with the respective polling reception originating terminal external apparatus corresponding to the polling reception originating terminal external apparatus number data, and causes said transmission control means to receive the image data from said polling reception originating terminal external apparatus.

3. A facsimile apparatus according to claim 2, wherein a plurality of sets of polling reception originating terminal apparatus number data and respective polling reception time data are set in said second memory means, corresponding to a plurality of said external apparatuses, and said automatic polling reception control means performs a control operation sequentially for the plurality of sets of the polling reception originating terminal apparatus number data and the polling reception time data.

4. A facsimile apparatus according to claim 1, wherein said second memory means stores relay apparatus number data, for selecting one of said external apparatuses to serve as a relay apparatus, and broadcast destination external apparatus number data for respective ones of a plurality other external apparatuses, as said external apparatus number data, and respective send time as said time data, said automatic sending control means compares the send time data stored in said second memory means with the time dignal from said clock means, and, upon detecting coincidence therebetween, supplies the respective relay apparatus number data stored in said second memory means to said network control means to cause said automatic dialling means thereof to connect the line with the relay apparatus corresponding to said relay apparatus number data, and causes said transmission control means to send the broadcast destination external apparatus number data stored in said second memory means and the respective image data from said first memory means to said relay apparatus, and said relay apparatus comprises first and second memory means for respectively storing said image data and said broadcast destination external apparatus number data, and, after storing the received data, transmits the respective image data to the respective external apparatuses according to said broadcast destination external apparatus number data.

5. A facsimile apparatus according to claim 4, wherein a plurality of sets of the relay apparatus number data, the broadcast destination external apparatus number data, and the second time data are stored in said second memory means as said external apparatus number data and time data, and the relay apparatus number data perform a control operation sequentially in accordance with said plurality of sets of data.

6. A facsimile apparatus according to claim 1, wherein said second memory means stores destination external apparatus number data as said external apparatus number data and destination send time data as said time data, for a plurality of the external apparatuses, and said automatic sending control means performs a control operation which includes comparing the send time data stored in said second memory means with the time signal from said clock device, and, upon detecting coincidence therebetween, supplies the respective destination external apparatus number data stored in said second memory means to said network control means to cause said automatic dialling means thereof to connect the line with a respective destination external apparatus corresponding to said destination external apparatus number data, and further causes said transmission control means to transmit respective image data to said destination external number apparatus.

7. A facsimile apparatus according to claim 6, wherein a plurality of sets of the destination external apparatus number data and the destination send time data are set in said second memory means, and said automatic sending control means performs said control operation sequentially for said plurality of sets of data.

8. The apparatus of claim 1, comprising a main memory in which said first and second memory means are provided, a main control section in which said automatic sending control means is provided, said means for inputting including a reading transmitting section, a data bus connected to said main memory, said network control means, said means for inputting and said main control section, a reading/transmitting section connected to said data bus, a transmission control section connected to said data bus, a modem connected to said network control means and to said transmission control means, and a respective control line connected from said main control section to each of said reception/recording section, means for inputting, main memory, transmission control section and network control means, and a further control line connected between said transmission control section and said main memory, wherein each of a plurality of said image data are automatically communicated between said facsimile apparatus and a further plurality of said external apparatuses according to respective ones of said external apparatus number data and time data.

9. A facsimile system for selectively communicating image data between a first facsimile apparatus and at least one external device, said first facsimile apparatus comprising connection control means for providing connection to each said external device, memory means for storing said image data, time data specifying the time for said communicating of said image data, and identification data identifying each said external device with respect to which said image data is to be communicated, clock means for generating a time signal, communication control means for comparing said time data with said clock signal, for causing, upon each coincidence therebetween, said connection control means to establish connection to the respective external device according to the respective identification data, and to cause the communicating of the respective image data.

10. The system of claim 9, wherein said image data is communicated from said at least one external device and stored in said memory means, in accordance with said time data and identification data stored in said memory means, whereby a polling function is provided.

11. The system of claim 10, wherein said transmission control means controls said connection control means for connecting successively to a plurality of the external devices, and respective image data is communicated from said plurality of external devices and stored in said memory means at respective times, in accordance with respective time data and identification data stored in said memory means.

12. The system of claim 9, wherein said image data is communicated out of said memory means to said at least one external device, according to said time data and identification data stored in said memory means, whereby a sending function is provided.

13. The system of claim 12, wherein said communication control means controls said connection control means for connecting successively to a plurality of the external devices, and respective image data stored in said memory means is communicated to the respective external devices at respective times, in accordance with the respective time data and identification data stored in said memory means.

14. The system of claim 9, having at least two of said external devices connected thereto, said identification data including relay number data identifying a selected one of said external devices to act as a relay device, and broadcast receive data identifying at least one other external device to which said image data is to be broadcast by said relay device, wherein said broadcast receive data is communicated along with the image data to said relay device, whereby a relay broadcast function is provided.

15. The system of claim 14, wherein said broadcast receive data and said image data communicated to said relay device includes data identifying a plurality of the external devices to which respective image data is to be sequentially communicated from said relay device.

16. The system of claim 15, wherein the same image data communicated from said relay device to each said other external device.

17. The system of any one of claims 9 to 16, wherein each said external device comprises a respective facsimile apparatus which is the same as said first facsimile apparatus.

18. The system of claim 17, wherein said image data is stored in said memory means in units of pages, and said communicating of said image data is in accordance with the number of pages thereof.

19. The system of claim 18, wherein said communicating control means includes means for providing a page transmission control function for determining when the communicating of the respective image data is completed on the basis of the pages thereof.

20. The system of claim 9, comprising a respective line connected to said first facsimile apparatus and each said external devices an and exchange station connected to each said line, wherein said communicating is via the respective ones of said lines and said exchange station.

21. The system of claim 9, wherein said connection control means dials said at least said one external device, and when said external device is busy, again dials said external device at a later time for establishing said connection therewith.

22. The system of claim 9, comprising
a plurality of said external devices,
a reading/transmitting section and a reception/recording section included in said first facsimile apparatus for respectively supplying and receiving said image data to and from said memory means, and a control panel in said first facsimile appartus for supplying the respective time data and identification data for each said communicating of said first facsimile apparatus,
wherein the operation of said reading/transmitting and reception/recording sections with respecto to inputting and outputting the respective image data operates independently of said communicating between said first facsimile apparatus and each respective external device.

* * * * *

UNITED STATES PATENT AND TRADEMARK OFFICE
CERTIFICATE OF CORRECTION

PATENT NO. : 4,646,160
DATED : February 24, 1987
INVENTOR(S) : Yoshi Iizuka, Shigeo Matsunaga, Satoshi Ogawa It is certified that error appears in the above-identified patent and that said Letters Patent is hereby corrected as shown below:

Column 1, line 38, "proposed:" should be --(as per Japanese Patent Application No. 57-100432; filing date: June 11, 1982; inventor: Yoshio Iizuka)--.

Column 2, line 8, "wherein:" should be --wherein--.

Column 3, line 19, "FIG." should be --FIGS.--;
line 26, "chart" should be --charts--;
line 59, "23a" should be --23a,--.

Column 4, line 49, "again The" should be --again. The--.

Column 8, line 27, after "B" insert --are--.

Column 10, line 44, after "B" insert --are--.

Column 12, line 47, "membry" should be --memory--.

Column 13, line 38, after "plurality" insert --of--;
line 40, after "time" insert --data--.

Column 16, line 24, "devices an and" should be device and an--;

UNITED STATES PATENT AND TRADEMARK OFFICE
CERTIFICATE OF CORRECTION

PATENT NO. : 4,646,160

DATED : February 24, 1987

INVENTOR(S) : Yoshi Iizuka, et al

It is certified that error appears in the above-identified patent and that said Letters Patent is hereby corrected as shown below:

Column 16, line 38, "appartus" should be -- apparatus --.
line 43, "respects" should be -- respect --.

Signed and Sealed this

First Day of September, 1987

Attest:

DONALD J. QUIGG

Attesting Officer

Commissioner of Patents and Trademarks